United States Patent [19]
Chalmers et al.

[11] 3,939,392
[45] Feb. 17, 1976

[54] INVERTERS

[75] Inventors: Brian John Chalmers, Bramhall; John Philip Gibson, Longsight, both of England

[73] Assignee: C.A.V. Limited, Birmingham, England

[22] Filed: Dec. 17, 1974

[21] Appl. No.: 533,620

[52] U.S. Cl. ................................... 321/11; 321/14
[51] Int. Cl.² ........................................ H02M 1/18
[58] Field of Search ............................ 321/11–14, 321/45 R, 45 C, 18

[56] References Cited
UNITED STATES PATENTS

| | | |
|---|---|---|
| 3,383,579 | 5/1968 | Hung ................................... 321/11 |
| 3,579,079 | 5/1971 | Kelley, Jr. ........................... 321/14 X |
| 3,590,323 | 6/1971 | Mapham et al. .................... 321/14 X |
| 3,760,258 | 9/1973 | Percorini et al. ............... 321/45 R X |
| 3,800,198 | 3/1974 | Graf et al. ...................... 321/45 C X |
| 3,852,656 | 12/1974 | Bourbeau ............................. 321/11 |

*Primary Examiner*—William M. Shoop

[57] ABSTRACT

An electrical inverter comprises first and second supply lines, which in use are connected to the positive and negative terminals of a d.c. supply. An inverting network is connected between the supply lines and has output terminals for connection to the load. A current sensing device is provided in one of the supply lines and is operable when the current flow in the supply line exceeds a predetermined value, to stop current flowing in the load for a predetermined period of time.

5 Claims, 9 Drawing Figures

INVERTERS

This invention relates to inverters.

An inverter according to the invention comprises in combination first and second supply lines, an inverting network connected between the supply lines, a plurality of output terminals associated with said inverting network and across which in use a load is connected, a current sensing device in one supply line, and means operable in use when the current in said device reaches a predetermined value for stopping current flowing from one supply line to the other, by way of the load, for a predetermined period of time.

Figure 1:
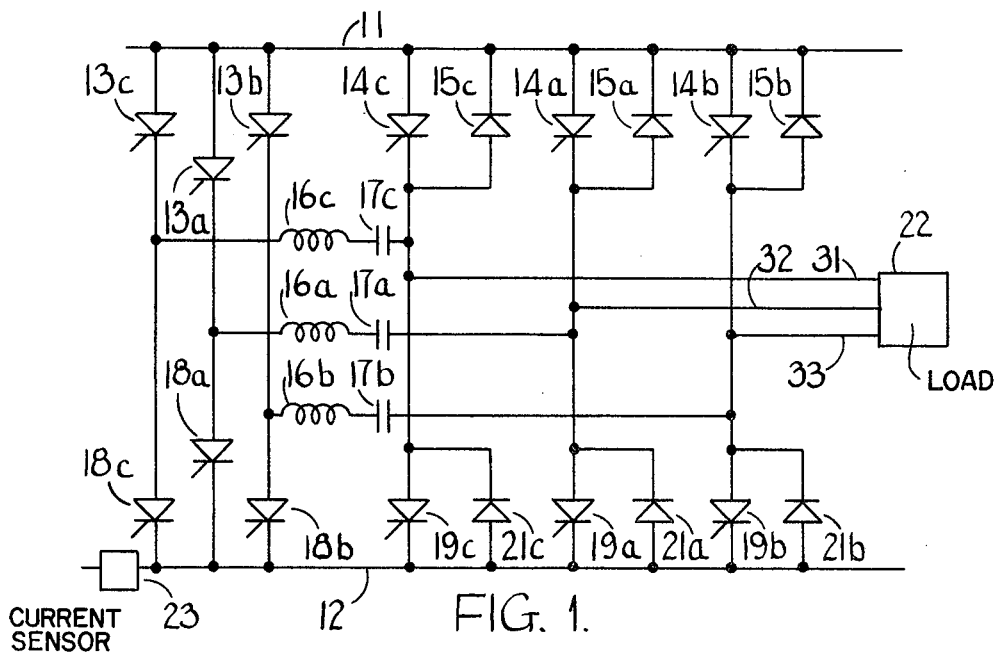
Figure 2:
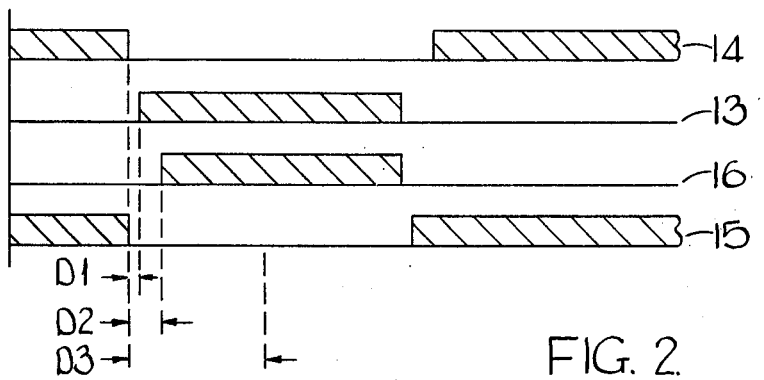
Figure 4:
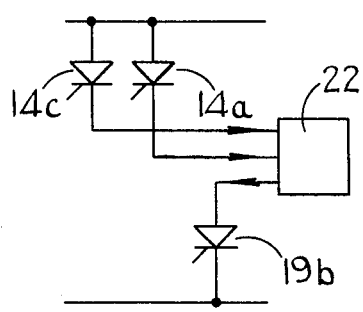
Figure 5:
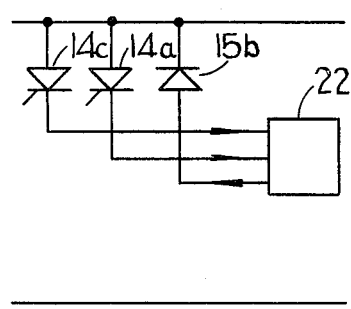
Figure 3:
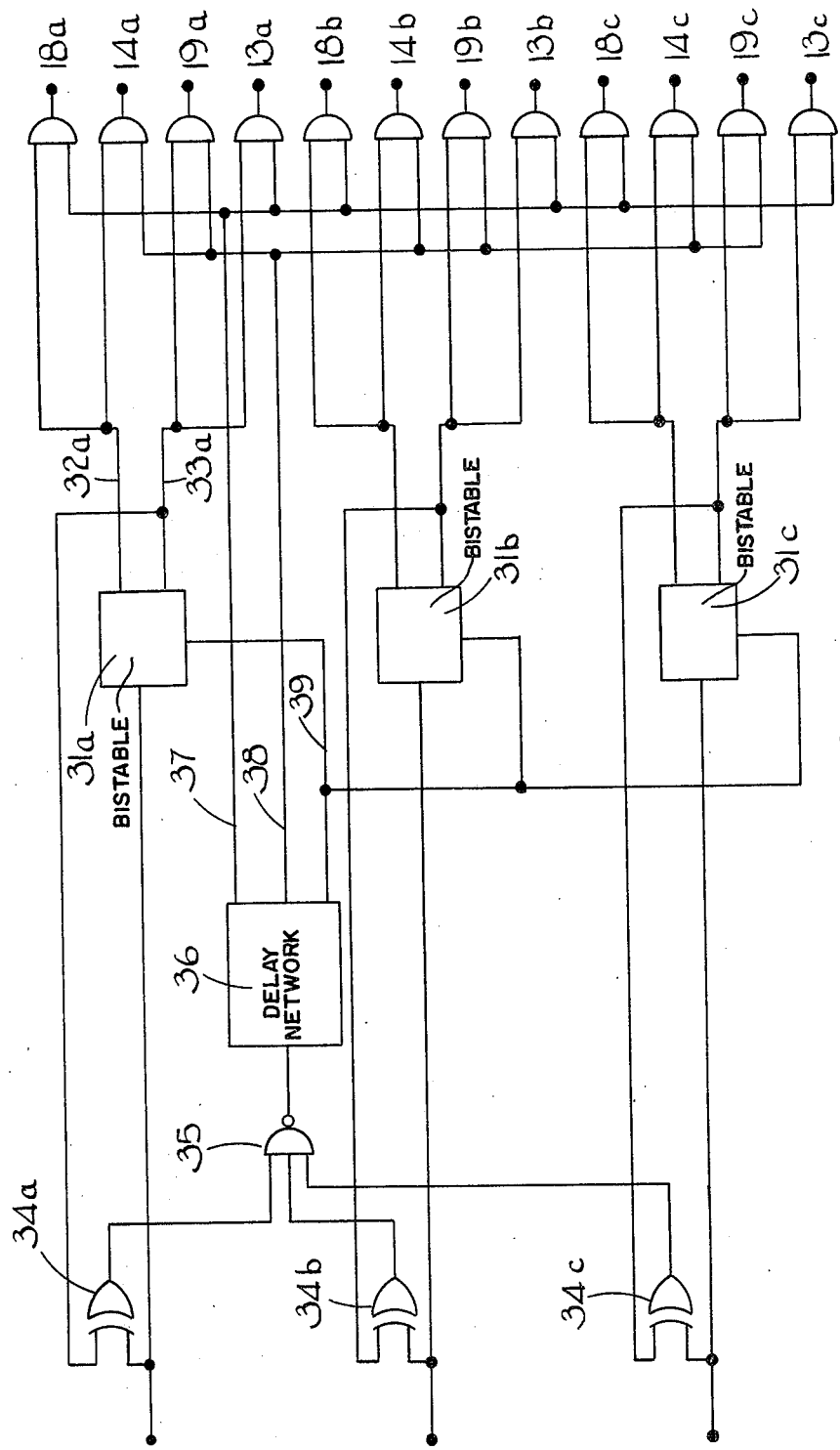
Figure 7:
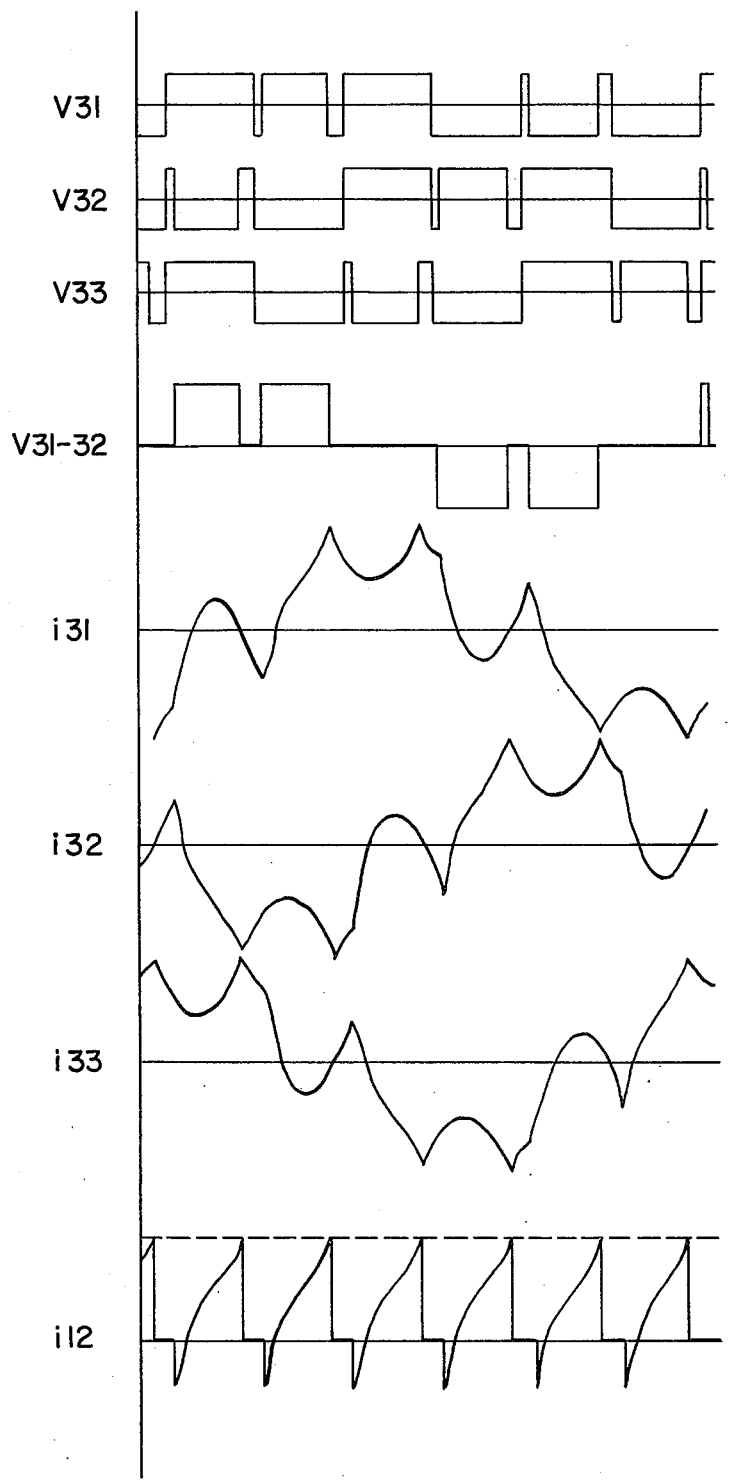
Figure 8:
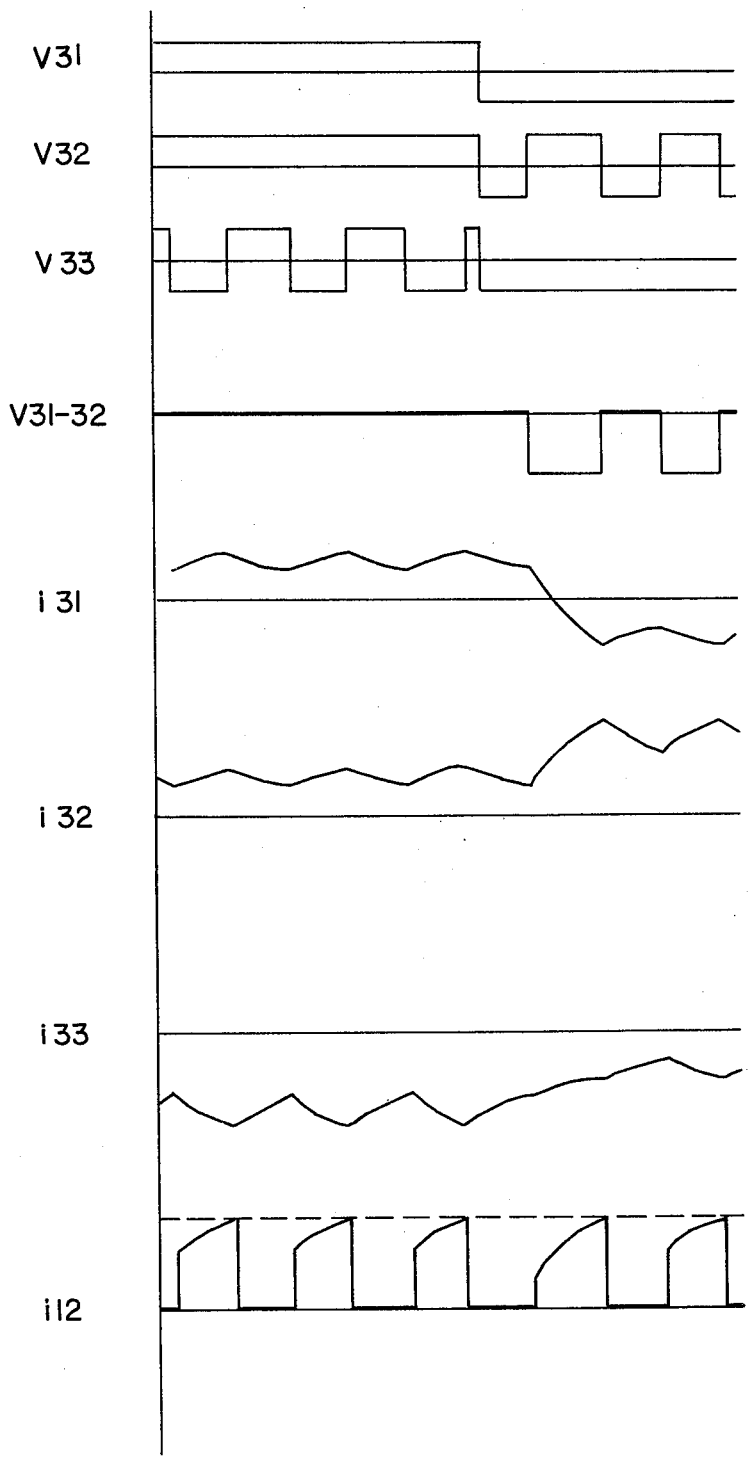
Figure 9:
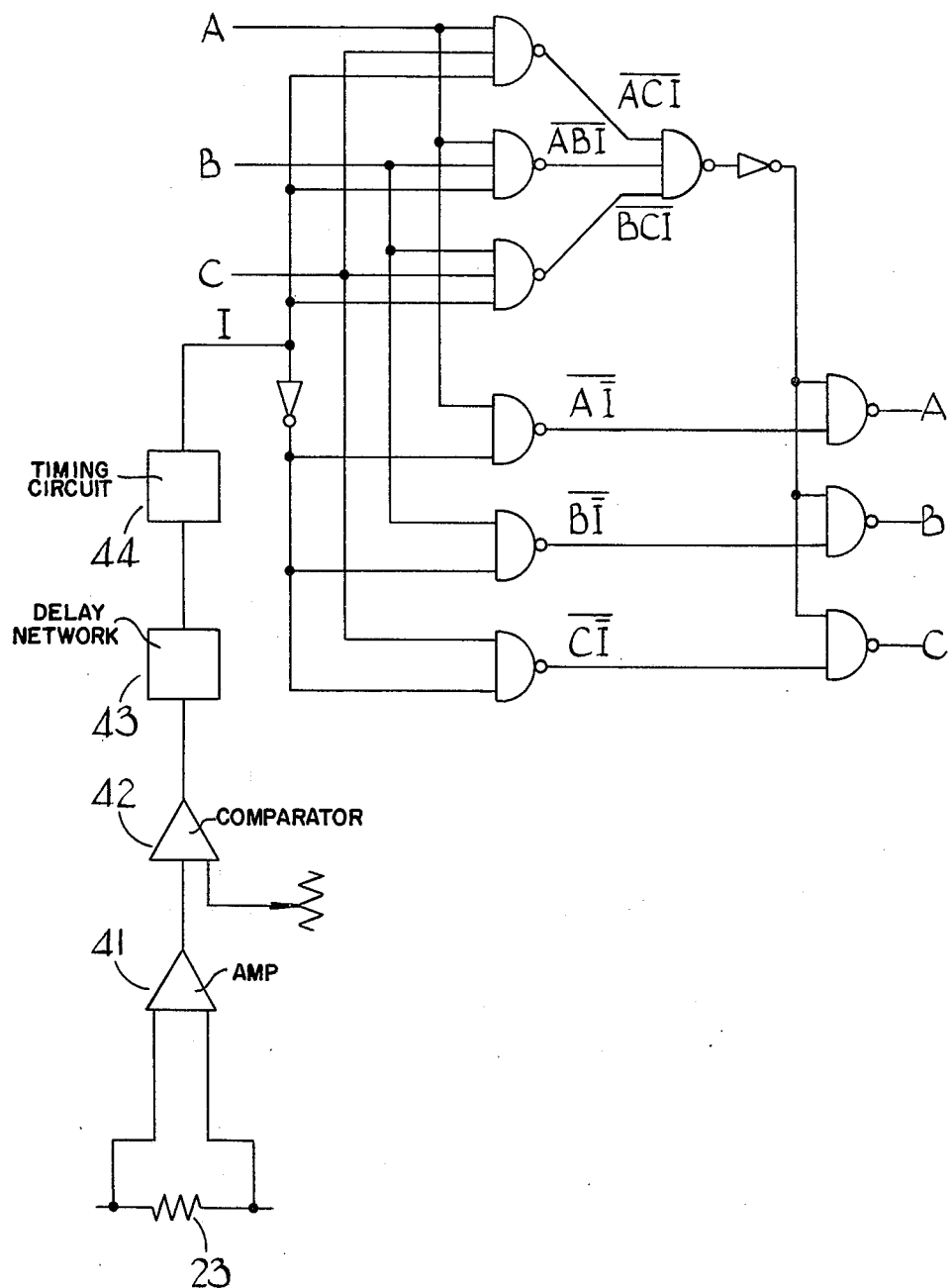

In the accompanying drawings,

FIG. 1 is a circuit diagram illustrating an inverter used in one example of the invention, FIG. 2 illustrates the firing pulses applied to thyristors forming part of the inverter of FIG. 1, FIG. 3 illustrates one form of firing control circuit, FIGS. 4 and 5 illustrate parts of FIG. 1, FIGS. 6 to 8 illustrate possible waveforms within FIG. 1, and FIG. 9 illustrates another part of the firing control circuit.

Referring to FIG. 1, there are provided positive and negative supply lines 11, 12. Connected to the supply line 11 are the anodes of a pair of thyristors 13a, 14a, the cathode of the thyristor 14a being connected to the line 11 through the anode-cathode path of a diode 15a. The cathodes of the thyristors 13a, 14a are interconnected through an inductor 16a and a capacitor 17a in series, and are further connected to the anodes of a pair of thyristors 18a, 19a having their cathodes connected to the line 12. The anode of the thyristor 19a is connected to the line 12 through the cathode-anode path of a diode 21a, and the anode of the thyristor 19a provides one input to a three phase load 22. Additionally, conventional suppressors may be employed to limit the rate of rise of current and/or voltage at various points in the inverter.

The components thus far described are duplicated for the other two phases, and are indicated by the same reference numerals with suffixes $b$ and $c$ respectively for the other two phases.

FIG. 2 shows the gating arrangements for the four thyristors in one of the phases. The gate signals applied to the thyristors can be d.c. signals or they can consist of a train of pulses. Where a train of pulses is used, then preferably the first pulse in the train has a greater amplitude and/or pulse length than the remaining pulses. It will be seen that at a given point in the cycle of one phase, gate current is supplied to the thyristors 14a and 18a so that the capacitor 17a is charged with its right-hand plate positive. Gate current is terminated through the thyristors 14a, 18a and after a short delay D1 the thyristor 13a is fired, causing the capacitor 17a to commutate the thyristor 14a. After a total delay D2 which is greater than D1, the thyristor 19a is fired and since the thyristors 13a and 19a are now both conducting, the capacitor 17a is charged with its left-hand plate positive. Later in the cycle, the gate current is removed from the thyristors 13a and 19a and then after another short delay D1 the thyristor 18a is fired, followed by firing of the thyristor 14a and so on. There is a further delay D3 during which the thyristors 18a and 14a are inhibited from firing pulses, so that two commutations cannot take place too close together.

The operation of the other two phases is similar, but of course the firing pulses for the various circuits overlap. In a typical arrangement, the load 22 is a three phase motor and the shaft of the motor operates any convenient form of encoder for producing output pulses in three trains, one train for each phase. A typical arrangement is shown in the following Table.

| SHAFT ANGLE | 0° | 60° | 120° | 180° | 240° | 300° | 360°(0°) |
|---|---|---|---|---|---|---|---|
| PHASE A | 1 | 1 | 1 | 0 | 0 | 0 | |
| PHASE B | 0 | 0 | 1 | 1 | 1 | 0 | |
| PHASE C | 1 | 0 | 0 | 0 | 1 | 1 | |

FIG. 3 shows the firing control circuit which has three input terminals A, B, C to which the outputs shown in the Table could be fed to operate the inverter in the required manner. For reasons which will become apparent later, the outputs are not fed directly to the terminals A, B, C but for the moment it will be assumed that they are. FIG. 3 shows 12 AND gates which are associated with the 12 thyristors in the inverter respectively. Each of the AND gates will, on receipt of two inputs of logical level 1, produce an output for operating the firing circuit associated with its respective thyristor. It will be seen that the terminal A is connected to the input of a bistable circuit 31a having a first output line 32a connected to the gates associated with the thyristors 18a and 14a and a second output line 33a connected to the gate associated with the thyristors 19a and 13a. In one state of the bistable circuit 31a the lines 32a are at logical 1 and 0 respectively, and in the other state they are at logical 0 and 1 respectively. The terminal A is also connected to an exclusive OR gate 34a which receives an input from the line 33a and provides an output by way of a NAND gate 35 to a delay network 36 controlling the output on three lines 37, 38, 39. The line 37 provides inputs to the gates associated with thyristors 13a and 18a and the line 38 provides inputs to the gates associated with the thyristors 14a and 19a. The terminals B and C have similar sets of components associated with them and these are indicated by the same reference numerals with the suffixes $b$ and $c$ respectively. The components 35 and 36 and the lines 37, 38 and 39 are common to all three phases, and it will be seen that the line 39 is connected to the bistable circuits 31a, 31b and 31c for a purpose to be described.

Considering the operation of phase A, then at a shaft angle of say 359° the lines 32a and 33a will be carrying signals 0 and 1 respectively, the lines 37 and 38 will be carrying signals 1 and the lines 39 signal 0. It will be seen that in these circumstances the gates of thyristors 19a and 13a will be receiving gate signals as required. At the 360° point, the input at terminals A changes from 0 to 1 and so the two input signals to the gate 34a are the same and the gate 34a provides an input by way of the gate 35 to trigger the delay network 36. Triggering of the delay network 36 drives the lines 37 and 38 to binary 0 and the line 39 to binary 1, thereby triggering the bistable circuit 31a so that the line 33a carries the signal 0 and the line 32a carries the signal 1. The bistable circuits 31a, 31b and 31c are now inhibited by the line 39. It will be seen that none of the gates associated with the thyristors 13a, 14a, 19a, 18a is now producing an output. However, at the end of the delay period D1 the signal 1 appears on line 37, so that the gate of thyristor 18a receives a firing pulse or pulses. At time D2, a signal 1 also appears on the line 38 so that firing pulses are fed to the gate of thyristor 14a. At time T3 the line 39 reverts to signal 0 and the bistable circuits 31a, 31b and 31c are inhibited. The operation is similar for the other two phases and can readily be seen from FIG. 3 taken in conjunction with the Table indicating the signals which can be fed to terminals A, B and C in FIG. 3.

Figure 6:
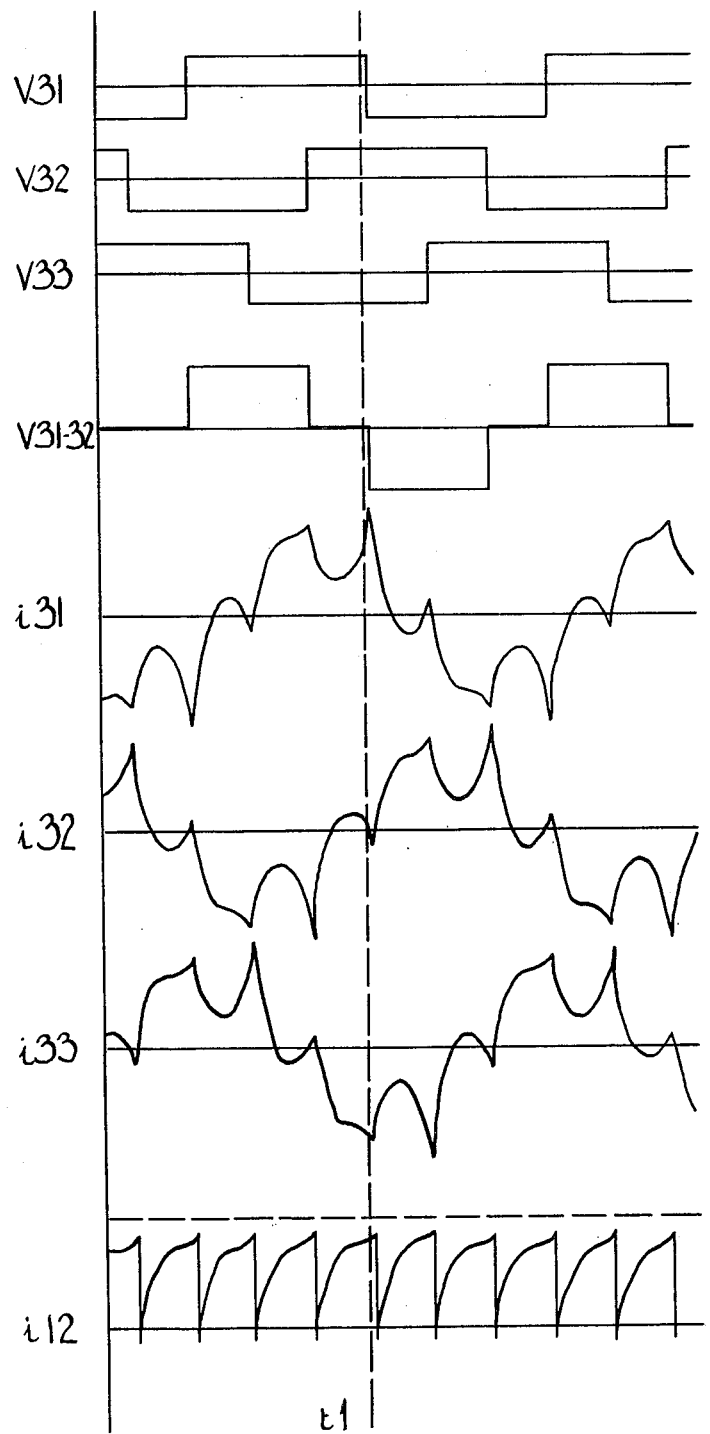

Whenever the current flowing through the device 23 (FIG. 1) is below a predetermined level, the operation of the inverter will be exactly as described above, and the voltage and current waveforms in the various parts of the circuit will be as shown in FIG. 6. There will in fact be six conductive patterns within the inverter during a cycle, and by way of example a typical conducting pattern at the time T1 indicated in FIG. 6 is shown in FIG. 4. Current flows to the motor through the thyristors 14a and 14c, the return path being provided by way of the thyristor 19b. The other five conducting paths can readily be identified, but for the purposes of explaining what happens when the current flowing in the device 23 exceeds a predetermined value, it is most convenient to consider simply the conducting paths shown in FIG. 4. If at any time the current flowing in the device 23 exceeds the predetermined value, then the thyristor 19b is turned off for a predetermined fixed period of time, and during this time the current flow in the device 23 will fall to zero. This is achieved by the normal switching arrangements within the inverter itself. Thus, at the instant when the current in the device 23 exceeds the predetermined value, the thyristor 18b is fired, so that the thyristor 19b is turned off. Shortly afterwards, the thyristor 14b is fired and the capacitor 17b completes its charging process by way of the thyristor 18b and the thyristor 14b or the diode 15b, after which the thyristor 18b turns off. The circuit then has the form shown in FIG. 5 with gate signals applied to the thyristors 14b even though the thyristor 14b is not conducting. The current flowing through the device 23 now falls to zero. Later, the thyristor 13b is fired and the capacitor 17b then discharges resonantly by way of the diode 15b. Shortly after the thyristor 19b is fired, and the capacitor 17b completes its charging process by way of the thyristors 13b and 19b. The circuit now has the form shown in FIG. 4 again, and if the current should rise above the predetermined level again, the circuit will revert to the condition shown in FIG. 5 for the fixed period of time. Similar switching action will occur in any of the six possible conducting patterns if the current in the device 23 exceeds the predetermined value.

It will be seen that the switching action in FIG. 4 and FIG. 5 is exactly the same as the switching action when the inverter is operating normally. The way in which this is achieved will be described later, but for the moment reference should be directed again to FIG. 6. In FIG. 6, the first three waveforms show the voltages on the lines 31 to 33 feeding the load 22, the next waveform shows the voltage between the lines 31, 32 the next three waveforms show the current flowing in the three phases of the motor, and the last waveform represents the current in the line 12, which is below the predetermined limit, indicated by the dotted line. FIG. 7 is similar to FIG. 6 and shows what happens when the predetermined level is just reached, and FIG. 8 shows what happens when the current is endeavouring to exceed the predetermined level by a substantial amount.

In order to achieve the required operation of the inverter when the current exceeds the predetermined level, all that is required is to ensure that the signals at the terminals A, B, C in FIG. 3 are modified during the aforesaid predetermined period of time so that the circuit operates as described with reference to FIGS. 4 and 5. A Table has already been given showing what signals are required at the terminals A, B, C during normal operation, that is to say when the current is below the predetermined level. During the predetermined period of time the Table is modified to read as follows:-

| SHAFT ANGLE | 0° | 60° | 120° | 180° | 240° | 300° | 360° (0°) |
|---|---|---|---|---|---|---|---|
| PHASE A | 1 | 0 | 1 | 0 | 1 | 0 | |
| PHASE B | 1 | 0 | 1 | 0 | 1 | 0 | |
| PHASE C | 1 | 0 | 1 | 0 | 1 | 0 | |

If a symbol I is defined, such that I is 0 in normal operation i.e., when the current is below the predetermined value and I is 1 during the predetermined time after detection of a current above the predetermined value, and the outputs from the three shaft encoders associated with the phases A, B and C respectively are denoted by the letters A, B and C, then the required input at terminal A in FIG. 3 can be expressed as follows.

Input $A = A.\bar{I} + A.\bar{B}.C.I + A.B.\bar{C}.I + \bar{A}.B.C.I$

The first term in this equation represents the situation when the current is below the predetermined limit, because in this case the input to the terminal A is the same as the output from the relevant encoder. The other three terms are obtained by inspection from the two Tables. Thus, at the 2° point the encoder produces signals 101 for phases A, B and C, and the required input as seen from the second Table is 111. The second term in the logical expression for input A indicates this state of affairs.

The expression for input A can be treated by normal mathematical techniques to produce the following result.

Input $A = \overline{A.\bar{I}} \quad . \quad \overline{A.C.I} \quad . \quad \overline{A.B.I} \quad . \quad \overline{C.B.I}$ and similarly it can be shown that

| Input B and | = | $\overline{B.I}$ | . | $\overline{A.C.I}$ | . | $\overline{A.B.I}$ | . | $\overline{B.C.I}$ |
| Input C | = | $\overline{C.I}$ | . | $\overline{A.C.I}$ | . | $\overline{A.B.I}$ | . | $\overline{B.C.I}$ |

A simple arrangement for achieving this effect is shown in FIG. 9. The device 23 is a resistor the voltage across which is fed to an amplifier 41 the output from which is fed to a comparator 42 which senses the predetermined current level by comparison with a reference and then provides an input to a delay network 43 the purpose of which is to ensure that no regard is taken of very short current peaks above the predetermined level. The output from the delay network 43 is fed to a timing circuit 44 which provides an input to a logic network. The timing circuit 44 sets the aforesaid predetermined time for which the inverter is driven from the condition of FIG. 4 (or an equivalent condition) to the condition of FIG. 5 (or an equivalent condition).

The logic network consists of ten NAND gates and two inverters. The input from the circuit 44 is fed to three of the NAND gates, and these gates also receive inputs from the shaft encoders to produce outputs in the required manner as indicated on the drawing. An inverted signal is fed to the other three NAND gates from the circuit 44 to produce the other three terms in the equation. The three output NAND gates combine the various terms as shown to provide the required inputs to the terminals A, B, C of FIG. 3.

It will be understood that the device 23 may be any d.c. current measuring device such for instance as a Hall probe.

We claim:

1. An electric inverter comprising in combination, first and second supply lines, an inverting network connected between the supply lines, a plurality of output terminals associated with said inverting network and across which in use a load is connected, a current sensing device in one supply line, and means for modifying the operation of the inverting network and operable in use when the current in said device reaches a predetermined value for stopping current flowing from one supply line to the other, by way of the load, for a predetermined period of time, said means including a delay network whereby no regard is taken of very short current peaks above the predetermined value.

2. An inverter as claimed in claim 1 in which said means also includes a timer operable to ensure that modification of the operation of the inverting network takes place only for said predetermined time.

3. An electrical inverter comprising in combination positive and negative supply lines, an inverting network including at least two inversion networks, each inversion network comprising first and second thyristors having their anodes connected to the positive supply lines and their cathodes connected respectively to the anodes of third and fourth thyristors the cathodes of which are connected to the negative supply line, an output line connected to the anode of the fourth thyristor and a commutating capacitor connected between the anodes of the third and fourth thyristors, the inverter further including a firing circuit which supplies gate signals to the thyristors of the inversion networks, the firing circuit providing gate signals to the thyristors of each inversion circuit in the order first, fourth, third and second, the gate signals supplied to the first and fourth thyristors terminating at substantially the same time as the commencement of the gate signal to the third thyristor and the gate signals supplied to the second and third thyristors terminating at substantially the same time as the commencement of the gate signal applied to the first thyristor, a current sensing means for sensing the current flow in one supply line, control means for supplying control signals to the firing circuit so that switching of the output lines to one or the other of the supply lines occurs in a prescribed time relationship, said control means upon receipt of a signal from said sensing means effecting a modification of the control signals to stop for a predetermined period of time the flow of current between the supply lines through a load connected to said output lines.

4. An electrical inverter as claimed in claim 3 in which said sensing means includes a delay network operable to delay the supply of said signal to said control means whereby no regard is taken of very short current peaks above the predetermined value.

5. An electrical inverter as claimed in claim 4 in which said sensing means includes a timer operable to ensure that said signal lasts only for a predetermined time.

* * * * *

UNITED STATES PATENT AND TRADEMARK OFFICE
CERTIFICATE OF CORRECTION

PATENT NO. : 3,939,392

DATED : February 17, 1976

INVENTOR(S) : BRIAN J. CHALMERS and JOHN P. GIBSON

It is certified that error appears in the above-identified patent and that said Letters Patent are hereby corrected as shown below:

Page 1, between [21] and [52], please insert

[30] Foreign Application Priority Data

Dec. 22, 1973 United Kingdom 59679/73

*Signed and Sealed this*

*twenty-second* Day of *June 1976*

[SEAL]

Attest:

RUTH C. MASON
*Attesting Officer*

C. MARSHALL DANN
*Commissioner of Patents and Trademarks*